May 3, 1955 J. E. VANCE 2,707,622
FOOD MIXER
Filed Oct. 4, 1951 2 Sheets-Sheet 1

INVENTOR.
John E. Vance
BY
*Harry S. Dumass*
ATTORNEY.

May 3, 1955

J. E. VANCE 2,707,622

FOOD MIXER

Filed Oct. 4, 1951

INVENTOR.
John E. Vance
BY
Harry S. Dunass
ATTORNEY.

United States Patent Office 2,707,622
Patented May 3, 1955

2,707,622
FOOD MIXER

John E. Vance, Canton, Ohio, assignor to The Hoover Company, North Canton, Ohio, a corporation of Ohio Application October 4, 1951, Serial No. 249,712

21 Claims. (Cl. 259—51)

The present invention relates to electric food mixers and more particularly to supporting the beater on a mixing receptacle.

An object of the invention is to provide nested receptacles the inner vessel being rotatably mounted on the outer and the latter removably supporting an electric beater. Another object is to provide nested receptacles having a locking device released by attachment of an electric beater to the outer vessel to permit rotation of the inner receptacle by action of the beater upon the contents of the inner receptacle. Another object is to provide nested receptacles, the outer vessel removably supporting an electric beater, and the receptacles being separable for individual use. Other objects and advantages of the inventon will be apparent from the following description and drawings, wherein:

Figure 1:
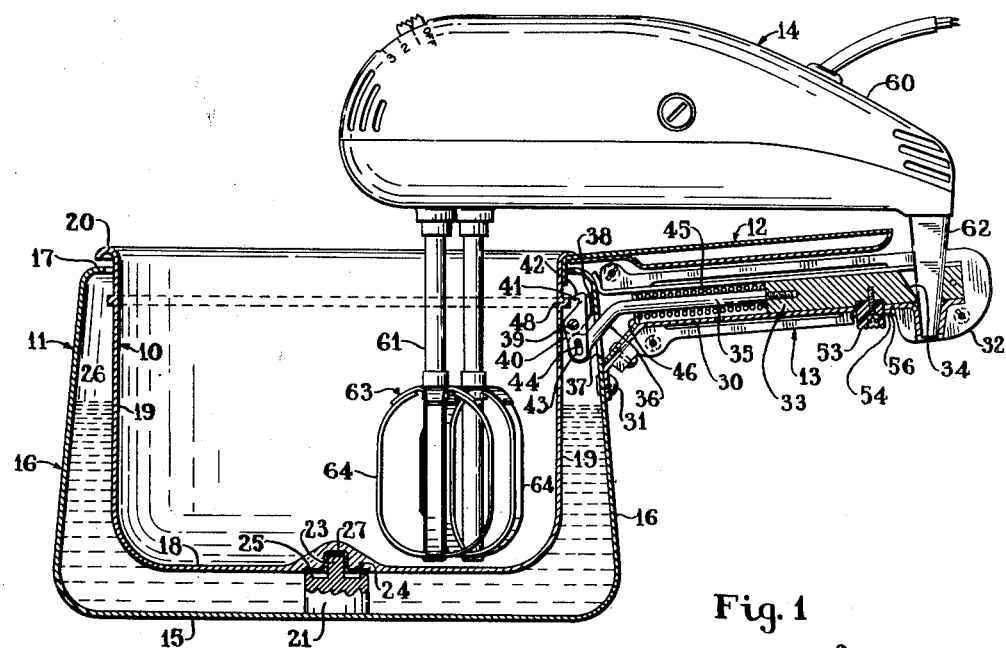
Figure 1 is a side view partly in section of one embodiment of the invention showing the nested receptacles and the electric beater mounted on the handle of the outer vessel to unlock the inner vessel for rotation with respect to the outer receptacle.
Figure 2:
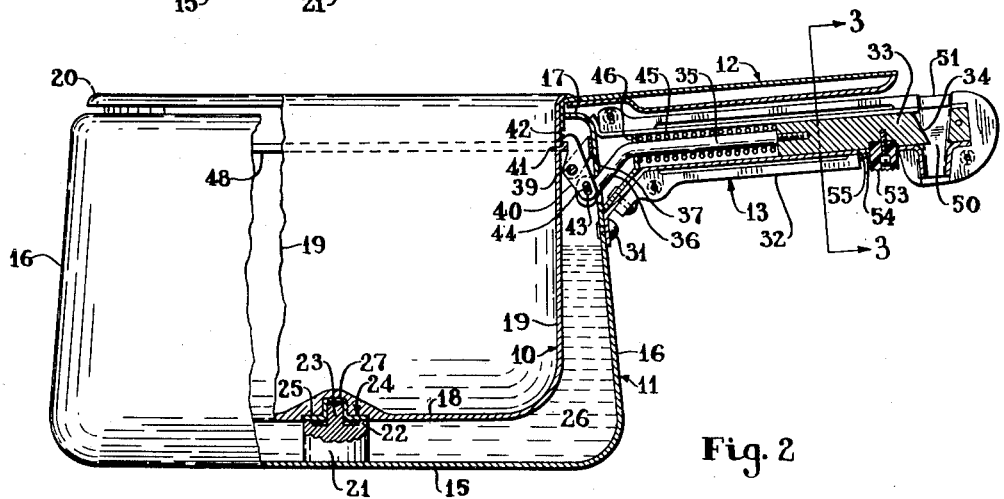
Figure 2 is a view similar to Figure 1 with the electric beater removed and the nested receptacles locked to prevent relative rotation.
Figure 3:
Figure 3 is an enlarged section along the line 3—3 of Figure 2.

The embodiment of the invention disclosed in Figures 1 to 3 comprises inner and outer receptacles 10 and 11 provided with carrying handles 12 and 13 respectively and an electric beater 14 removably supported on the handle 13 of the outer container. The receptacles 10 and 11 cooperate to form a double boiler of the type employed in cooking on a kitchen range. The outer vessel 11 has a bottom wall 15 and an annular side wall 16 terminating in an inwardly projecting flange 17, and the inner vessel 10 includes a bottom wall 18 and an annular side wall 19 provided with an outwardly extending peripheral flange 20. Projecting upwardly from the outer bottom wall 15 is a stationary bearing hub 21 having a longitudinally extending peripheral supporting rib 22 and a centrally projecting locating lug 23. A bearing member 24 is seated centrally in the exterior surface of the inner bottom wall 18 and has a flat bearing surface 25 which rests upon the rib 22 to rotatably support the inner vessel 10 in spaced relation with respect to the outer container 11 and form therewith an annular chamber 26 for water to heat the contents of the inner vessel 10. The lug 23 enters a recess 27 in the member 24 to locate the inner vessel 10 on the bearing hub 21. In addition, the hub member 21 by engagement with the bearing surface 25 spaces the carrying handle 12 above the carrying handle 13 to permit relative rotation therebetween.

The handle 13 for the outer receptacle 11 includes a tubular member 30 attached by rivets 31 to the container side wall 16 and is covered by a suitable heat insulating material 32. Slidably mounted in the tubular member 30 is a plunger 33 having a cam surface 34 at its outer end and at its inner end a push rod 35 is provided with a downwardly offset portion 36 extending through an opening 37 in the side wall 16 of the outer vessel 11. Mounted on the inner surface of the container side wall 16 above the opening 37 is a U-shaped bracket 38 provided with a pin 39 rotatably supporting a latch lever 40 having a hook 41 and a cam surface 42 at one end and at the opposite end is an elongated opening 43 which movably receives a pin 44 connected to the inner end of the push rod 35. A spring 45 is arranged about the push rod 35 between the inner end of the plunger 33 and a bracket 46 mounted on the tubular member 30. The hook 41 is normally urged by the spring 45 into a locking engagement with an annular rib 48 on the side wall 19 of the inner container 10 to prevent rotation of the latter with respect to the outer vessel 11, and the cam surface 34 on the plunger 33 is disposed in a tapered rectangularly shaped opening 50 extending vertically through the handle 13 provided with an entrance 51, as shown in Figure 2.

Attached to the plunger 33 is an operating member 53 projecting through an elongated opening 54 in the wall of the tubular handle portion 30, and is provided with a serrated surface to receive the operator's finger to move the plunger 33 and rod 35 to the left, as viewed in Figure 2, causing the latch lever 40 to rotate clockwise and disengage the hook 41 from the rib 48, whereby the inner vessel 10 can be removed from the outer container 11. When the operator's finger is removed from the member 53, the spring 45 moves the hook 41 and the plunger 33 to their locked positions. Movement of the plunger 33 in its opposite directions is limited by the member 53 engaging the end walls 55 and 56 of the opening 54.

The electric beater 14 is provided with an elongated housing 60 from the front end of which projects a pair of beater shafts 61, and at the opposite end is a supporting post 62 of tapered rectangular cross section. An unshown electric motor and driving means for the beater shafts 61 is disposed within the housing 60. Each beater shaft is provided with a beater element 63 having a plurality of blades 64 arranged in overlapping relation for rotation in opposite directions. The beater 14 is supported on the outer receptacle 11 by inserting the rectangular post 62 in the tapered opening 50 to position the housing above the handles 12 and 13 and overhang the interior of the receptacles 10 and 11.

When the device is used as a double boiler on a cooking range the electric beater may be removed from the handle 13, whereby the spring 45 moves the plunger 33 to the right and pivots the latch lever 40 counter-clockwise, as viewed in Figure 2, into locking engagement with the rib 48 on the inner vessel 10. In order to add water to the outer vessel 11 the operator moves the member 53 to the left to disconnect the hook 41 from the locking rib 48 to permit removal of the inner vessel 10. After the water has been added, the vessel 10 is inserted in the outer container 11 and the side wall 19 and the rib 48 engage the cam surface 42 on the upper end of the latch lever 40 to pivot the latter clockwise and allow the rib 48 to be seated beneath the hook 41 which is then rotated counter-clockwise by the spring 45 into locking engagement with the rib 48 to prevent relative rotation between the vessels 10 and 11. The device is then in condition to be used as a double boiler on a range for cooking foods.

If it is desired to mix the contents of the inner vessel without rotating the latter, the operator grasps the beater housing 60 in his hand and inserts the beater elements 64 into the inner bowl 10 to carry out the required beating. During this mixing operation, the hook 41 prevents rotation of the inner vessel 10.

The electric beater may be supported on the outer vessel 11 by inserting the post 62 into the handle opening 50 to space the motor housing 60 upwardly from the handle 12 and project over the inner vessel 10 to position the agitators 64 within the vessel 10 in proper relation to the side wall 19 to rotate the inner vessel by action of the agitators 64 on the contents in the inner vessel in a manner well known in the art. Insertion of the post 62 in the opening 50 causes the plunger 33 to move to the left and the hook 41 to pivot clockwise to its unlocked position shown in Figure 1, whereby the inner vessel 10 is free to rotate upon the bearing hub 21. The motor housing 60 is spaced above the handle 12 to permit rotation of the latter relative to the outer vessel 11.

When the beater is removed from the outer vessel 11, the vessels may be unlocked and separated for use individually as cooking utensils, and the beater 14 may be mounted on the handle 13 for stirring the contents in the outer vessel 11.

Figure 4:
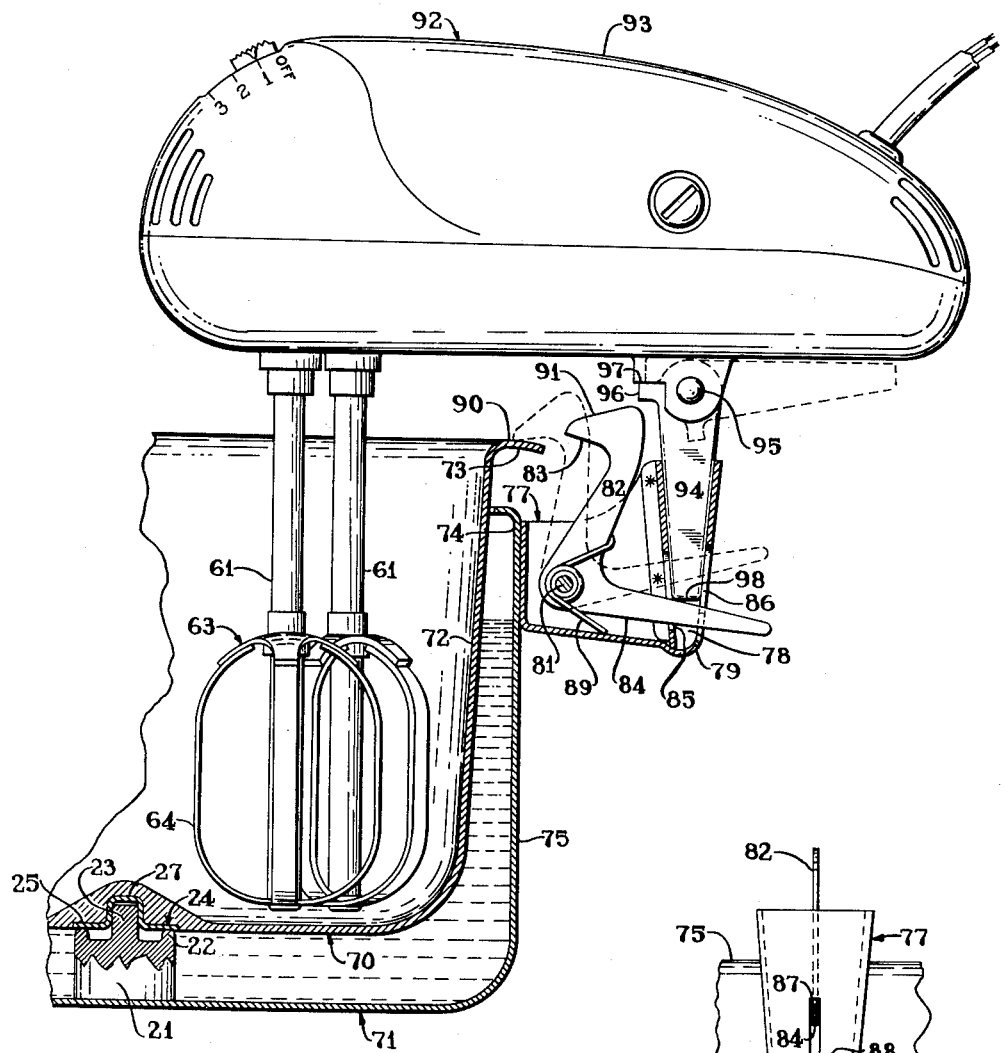
Figure 4 is a side view partly in section of another embodiment of the invention showing in full lines the locking device released when the electric beater is supported on the outer receptacle, and in dotted lines the position of the locking device when the electric beater is removed.
Figure 5:
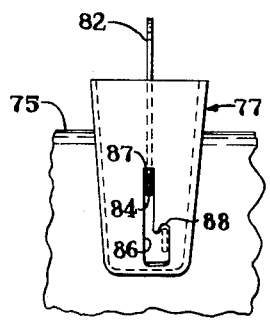
Figure 5 is an elevational view of the means for retaining the locking device in its different positions.

The embodiment of the invention disclosed in Figures 4 and 5 is similar to the structure in Figures 1 to 3 with the exception of the carrying handles on the receptacles and the arrangement of the locking device exteriorly of the outer vessel. The present embodiment comprises a double boiler having inner and outer receptacles 70 and 71, the latter provided with the bearing hub 21 engaging the bearing plate 24 to rotatably support the inner vessel 70. The inner vessel 70 has an annular side wall 72 terminating at its upper end in an outwardly extending peripheral flange 73 which is spaced above and laterally of the upper end 74 of the side wall 75 of the outer vessel 71. The flange 73 forms a peripheral handle for carrying the inner vessel 70.

Attached to the side wall 75 of the outer vessel 71 is a bracket 77 formed at its outer portion with a rectangular socket 78 tapering downwardly to a closed end 79. The closed end 79 forms a carrying handle for the outer vessel 71 and a suitable unshown handle may be arranged diametrically opposite to provide another carrying handle. Mounted on the bracket 77 is a pin 81 pivotally supporting a latch lever 82 having a hook 83 and an operating arm 84. The arm 84 projects through elongated openings 85 and 86 in the socket 78, and the opening 86 is provided with stops 87 and 88 to position the hook 83 in its locked and unlocked positions. A torsion spring 89 about the pin 81 urges the hook 83 counter-clockwise into engagement with the top surface 90 of the flange 73 to prevent rotation of the inner vessel 70 and also moves the latch arm 84 against the stop 87 in the opening 86 as shown in dotted lines in Figure 4. The lever arm 84 projects beyond the socket 78 for manipulation by the operator, downward movement of the arm 84 causes clockwise rotation of the hook 83 to its unlocked position shown in full lines in Figure 4. The hook 83 may be held in its unlocked position by shifting the arm 84 against the stop 88, and the torsion spring 89 exerts a counter-clockwise force on the arm 84 to resistingly maintain the latter in its unlocked position. A cam surface 91 is provided on the hook 83 for engagement with the peripheral edge of the flange 73 to move the hook 83 from its dotted line to full line position shown in Figure 4 when the vessel 70 is placed within the outer receptacle 71, and thereafter the spring 89 rotates the hook 83 into locking engagement with the flange 73.

An electric beater 92 has an elongated housing 93 in which is mounted a suitable motor and gearing for rotating the beater elements 64. A supporting post 94 is pivotally mounted by a pin 95 to the housing and has a lug 96 engageable with a surface 97 on the housing 93 to limit counter-clockwise rotation of the latter with respect to the post 94. The post 94 has a tapered rectangular cross-section to seat in the socket 78 and its lower surface 98 abuts the arm 84 to move the latter downwardly and pivot the hook 83 to its unlocked position. The cross-sectional area of the housing 93 is relatively small for the operator to grasp it in his hand for use as portable beater, and the post 94 can be pivoted to an inoperative position as shown in dotted lines in Figure 4.

The present embodiment is employed in the same manner as the structure disclosed in Figures 1 to 3. When the beater is removed, the vessels 70 and 71 can be used as a double boiler, and moving the latch arm 84 against the stop 88 to its unlocked position permits separation of the vessels for individual use, and the beater 92 can then be mounted on the outer vessel 71 for mixing contents therein. When the vessels are in nested relation and the beater post 94 inserted in the socket 78, the hook 83 is moved to its unlocked position and the action of the beater elements 64 on the contents in the inner vessel 70 causes the latter to rotate on the bearing hub 21 with respect to the outer vessel 71.

While I have shown and described but two embodiments of my invention, it is to be understood that those embodiments are to be taken as illustrative only and not in a limiting sense. I do not wish to be limited to the particular structures shown and described but to include all equivalent variations except as limited by the scope of the claims.

I claim:

1. In a kitchen cooking utensil of the double boiler type for use on a heating range, a pair of receptacles each separately usable on the range and shaped to be arranged in nested relation to provide inner and outer cooking vessels for use as a double boiler, a carrying handle on said inner vessel projecting laterally above said outer vessel, means supporting said inner vessel for rotation of the latter and said handle with respect to said outer vessel, motor driven beater means, and means on said outer vessel removably supporting said motor driven beater means spaced from said carrying handle and in said inner vessel to rotate the latter and said carrying handle by the action of said beater means on the contents of said inner vessel.

2. In a mixer, the combination of inner and outer nested receptacles, means supporting said inner receptacle for rotation with respect to said outer receptacle, motor driven beater means arranged in said inner receptacle with respect to the wall thereof to rotate the said inner receptacle by the action of said beater means on the contents of said inner receptacle, means on said outer receptacle supporting said motor driven means in said arrangement with respect to said inner receptacle, and cooperating latch means on said receptacles to prevent rotation of said inner vessel with respect to said outer vessel.

3. In a mixer, the combination of inner and outer nested receptacles, means supporting said inner receptacle for rotation with respect to said outer receptacle, motor driven beater means arranged in said inner receptacle with respect to the wall thereof to rotate the said inner receptacle by the action of said beater means on the contents of said inner receptacle, means on said outer receptacle supporting said motor driven beater means in said arrangement with respect to said inner receptacle, and cooperating latch means on said receptacles to prevent rotation of said inner vessel with respect to said outer vessel, and including means actuated by attachment of said motor driven beater means to said outer vessel to unlock said inner vessel for rotation of the latter.

4. In a mixer, the combination of inner and outer nested receptacles, means supporting said inner receptacle for rotation with respect to said outer receptacle, motor driven beater means, a carrying handle on said outer receptacle, and means on said carrying handle supporting said motor driven means in said inner receptacle with respect to the wall thereof to rotate said inner receptacle by the action of said beater means on the contents of said inner receptacle, and latch means on said carrying handle engageable with said inner vessel to prevent rotation of the latter with respect to said outer vessel.

5. A kitchen utensil comprising a pair of open topped receptacles each separately useable for containing foods and shaped to be arranged in nested relation, motor driven beater means, a handle on the outer receptacle to carry the receptacles in said nested relation from place to place, and means on said carrying handle solely supporting said motor driven beater means to project through the open top of said inner receptacle to agitate the contents in the inner nested receptacle.

6. A kitchen utensil comprising a pair of open topped receptacles each separately useable for containing foods and shaped to be arranged in nested relation, means supporting the inner receptacle for rotation with respect to the outer receptacle, motor driven beater means, a handle on said outer receptacle to carry the receptacles in said nested relation from place to place, and means on said carrying handle solely supporting said motor driven beater means to project through the open top of said inner receptacle with respect to the wall thereof to rotate said inner receptacle by the action of said beater means on the contents of said inner receptacle.

7. A domestic food mixer comprising, an open topped cooking utensil having a bottom and upright side walls, a carrying handle rigidly secured to the outer side wall of said utensil and projecting laterally therefrom, an open topped mixing vessel having a bottom and side walls designed to nest within said utensil through the open top thereof and in spaced relation to the bottom and side walls thereof, bearing means interposed between said utensil and mixing vessel to support the latter for rotation about a vertical axis within said utensil, a power unit, means for detachably supporting said power unit from said carrying handle at a point thereon spaced laterally from the rim of said mixing vessel, said power unit having one end overlying said mixing vessel, and a pair of beater elements connected to said one end of the power unit and extending downwardly into said vessel, said beater elements being offset from the axis of said mixing vessel and effective through the material being mixed to rotate said vessel when the power unit is energized.

8. A light weight readily portable domestic food mixer comprising, a pair of open topped nested cooking utensils the inner one of which is arranged to fit through the open top of the outer utensil, a carrying handle projecting laterally from a point adjacent the rim of said outer utensil, bearing means located between said nested utensils for supporting said inner utensil for rotation relative to said outer utensil about a vertical axis, an elongated encased power unit, supporting bracket means carried by said power unit, means for detachably securing said bracket means to the carrying handle for said outer utensil so that one end of said unit overlies said inner utensil, and beater means carried by said one end of said power unit and projecting downwardly into said inner utensil to one side of the axis of rotation thereof and effective through the material being mixed to rotate said inner utensil.

9. In combination, an open topped cooking utensil having a rigid carrying handle projecting laterally from the side wall thereof, a socket in said handle, a self-contained motor power unit having a supporting bracket projecting downwardly therefrom and adapted to seat in said socket so as to support said power unit above said handle with one end thereof overlying the interior of said cooking utensil with the center of gravity of said power unit within the vertically projected confines of said cooking utensil whereby said power unit is supported by said cooking utensil, said power unit having at least one beater element drivingly connected to said one end of said power unit and projecting downwardly into said cooking utensil to agitate the contents thereof, said power unit and supporting bracket being readily detachable from the socket in said carrying handle when the contents of the utensil have been stirred.

10. In combination, an open topped sauce pan having a carrying handle firmly anchored to the side wall thereof and projecting laterally therefrom at a level above the geometric center of said sauce pan, a motor power unit adapted to drive beating means for the contents of said sauce pan, bracket means carried by said power unit arranged to detachably support the same on said carrying handle so that the center of gravity of said unit overlies the open top of said sauce pan whereby said power unit is supported by said sauce pan, and beater means connected to said power unit and extending downwardly into said sauce pan to stir the contents thereof when said power unit is energized.

11. In combination, an open topped sauce pan having a carrying handle anchored to the outer side of its side wall and projecting laterally therefrom in a substantially horizontal plane at a level above the geometric center of said sauce pan, an elongated motor-driven power unit having an outer casing of a size which can be readily grasped between the fingers and thumb of an operator's hand, means for detachably supporting said power unit on said sauce pan with its longer axis extending substantially horizontally in a plane spaced above the open top and carrying handle of said sauce pan, said supporting means comprising separable coupling means carried in part by said sauce pan handle and in part by said power unit, the arrangement being such that when said power unit is coupled to said handle the center of gravity of said unit overlies the open top of said sauce pan, and beater means coupled to said power unit and projecting downwardly into said pan in spaced relation to the inner side wall thereof for stirring the contents of said sauce pan when said power unit is energized.

12. In combination, an open topped sauce pan having a carrying handle anchored to the outer side of its side wall and projecting laterally therefrom in a substantially horizontal plane at a level above the geometric center of said sauce pan, said handle having a rigid metal core and a covering therefor of heat insulating material forming a hand grip by which the sauce pan may be carried from place to place in the kitchen when hot, an elongated motor driven power unit for driving a pair of beater elements, readily disconnectable coupling means for supporting said power unit on said carrying handle with one end of said unit overlying said sauce pan, said coupling means being formed in part on said sauce pan handle and in part on said power unit, said parts of said coupling means being separable from one another by lifting said power unit upwardly away from said handle, the center of gravity of said power unit when supported on said handle overlying the top of said sauce pan, and a pair of beater elements connected to said one end of said power unit and extending downwardly into said sauce pan in spaced relation to the inner walls thereof for agitating the contents thereof when said power unit is energized.

13. In combination, an open topped sauce pan for use in cooking foodstuffs on a kitchen stove, said pan having a carrying handle projecting laterally from the side wall thereof at a point near the top rim thereof, said handle having a grip by which the same may be grasped by the hand so that said pan can be carried from and to a stove, means forming a socket opening upwardly through the upper surface thereof, a motor driven power unit of a size which can be readily grasped in the operator's hand, a supporting post for said unit projecting downwardly therefrom and shaped to be received and seated in the socket in said carrying handle so as to support said power unit with its center of gravity overlying the bottom of said sauce pan, said power unit being readily connectable to and disconnectable from the socket in said handle by lowering said post into or lifting said post out of said socket, and rotary beater means projecting downwardly into said sauce pan from said one end of said power unit for agitating the contents of said sauce pan.

14. A domestic food mixer comprising, a supporting base for a power driven beater device formed by an open topped cooking utensil having a substantially flat bottom and an upstanding tubular side wall, a carrying handle projecting laterally from said side wall at a point spaced above the geometric center of said cooking utensil and shaped to be grasped by an operator's hand for the carrying of said utensil from place to place, a motor beater unit for beating the contents of said utensil and including beater elements adapted to project downwardly into said utensil thru the open top thereof, and disconnectable coupling means for supporting said motor-beater unit from said carrying handle comprising readily disconnectable male and female parts, one of said coupling parts being carried by said handle and the other of said parts being carried by said motor-beater unit.

15. A domestic food mixer comprising, a supporting base for a power driven beater device formed by an open topped cooking utensil having a substantially flat bottom and an upstanding tubular side wall, a carrying handle projecting laterally from said side wall having a grip which can be grasped for carrying said utensil from and to a stove, a power unit adapted to be supported so that its center of gravity overlies the open top of said utensil and with its outer end overlying said carrying handle, beater elements coupled to the inner end of said power unit and projecting downwardly into said utensil through the open top thereof to stir the contents of said utensil, and supporting bracket means for supporting said power unit from said carrying handle, said bracket means being spaced rearwardly from said power unit center of gravity and toward the outer end thereof whereby said power unit and the beater elements coupled thereto are supported cantilever fashion from said cooking utensil carrying handle.

16. A domestic food mixer for use on or off a cooking stove comprising, a supporting base formed by a wide based open topped cooking utensil having an elongated handle anchored to and projecting from the side wall thereof at a point above the geometric center of said utensil, said handle having a grip portion which can be grasped by the operator's hand to carry the utensil from place to place, an elongated motor driven power unit adapted to be supported horizontally above said utensil so that its inner end overlies the open top of said utensil and so that its outer end overlies said carrying handle, said power unit having an exterior circumference such that it can be readily grasped by the operator's hand, beater means secured to the inner end of said unit and projecting downwardly into said utensil for agitating the contents thereof, and means for supporting said power unit cantilever fashion from said utensil carrying handle, said supporting means being connected to said carrying handle at one end of the grip portion thereof so as to leave said grip free to be grasped by the operator.

17. A domestic food mixer comprising, an open topped cooking utensil having a wide based bottom and upstanding side walls, carrying handle for said utensil secured to the outer wall thereof above its geometric center of gravity, said handle having a non-circular socket therein, a motor driven power unit for a food agitating means adapted to be detachably supported from said carrying handle, non-circular stud means carried by said power unit shaped to be received and firmly seated in said handle socket to support said power unit cantilever fashion in a position overlying said carrying handle and with the center of gravity of said power unit within the vertically projected confines of the base of said cooking utensil.

18. A domestic food mixer comprising, an open topped cooking utensil having a wide based bottom and upstanding side walls, a carrying handle for said utensil fixed to said side wall and projecting laterally therefrom at a point above the horizontal median plane thereof, a socket opening through a wall of said carrying handle adapted to receive and seat a supporting stud for a food agitating device, a motor driven power unit, a supporting stud carried by said power unit shaped to seat firmly in said handle socket and to support said unit cantilever fashion from said handle with one end of the power unit overlying the open top of said cooking utensil, a hinged joint between said stud and said power unit operable to permit said stud to pivot between an extended position in which it is operable to support said unit in said position overlying the open top of said utensil and a retracted position in which it is folded against the side of said power unit for compact storage when the mixer is not in use, and food agitating means carried by said power unit and extending downwardly into said utensil through the open top thereof for agitating foodstuffs when said power unit is energized.

19. A domestic food mixer comprising a pair of receptacles each separately usable for containing food and each open topped and shaped to be arranged in nested relation, bearing means interposed between said receptacles to support the inner receptacle for rotation within the outer receptacle, a power unit having beater means, means on said outer receptacle and power unit for detachably supporting the latter to project said beater means through said open top of said inner receptacle and arranged with respect to the wall thereof to rotate said inner receptacle by the action of said beater means on the contents of said inner receptacle, and said means for supporting said power unit being so arranged that the center of gravity of said power unit lies within the vertically projected confines of said outer receptacle whereby said power unit and its beater means are supported solely by said outer receptacle.

20. In combination, a pair of open topped cooking utensils of generally similar shape but of different size, the smaller of said utensils being adapted to nest within the larger, anti-friction bearing means located between said nested utensils for rotatably supporting the bottom and side walls of the smaller utensil in spaced relation to the bottom and side walls of the large utensil and for relative rotation with respect to one another about a vertical axis, an electric motor driven power unit, rotary beater means connected to said power unit and extending downwardly from one end thereof into the smaller one of said utensils, means for supporting said power unit from above said nested utensils with said motor extending across the rims of said nested utensils at one side thereof, means for supporting one end of said power unit supporting means directly from a wall of said larger cooking utensil without interfering with the rotation of said smaller utensil on said bearing means, and said power unit supporting means being so arranged that the center of gravity of said unit overlies the bottom wall of said larger cooking utensil whereby the complete assembly is stable and self-supporting on the bottom of said larger utensil.

21. A portable food mixer, said mixer having as its sole base an open topped cooking utensil having a large area bottom wall and upstanding side walls, an electric motor, beater means detachably connected to one end of said motor so as to be driven thereby and projecting from said motor in a direction generally normal to its axis of rotation, means for supporting said motor above said utensil with said beater means extending downwardly into the utensil and with the axis of said motor extending across a rim of the utensil so as to obstruct access to said utensil to a minimum degree, readily disconnectable coupling means for supporting said electric motor and the supporting means therefor from a wall of said cooking utensil with the center of gravity of said motor lying within the vertically projected perimeter of the bottom wall of said utensil whereby said mixer is stable and supported by the bottom of said utensil.

References Cited in the file of this patent

UNITED STATES PATENTS

| | | |
|---|---|---|
| 970,205 | Forster | Sept. 13, 1910 |
| 1,295,684 | Bouquin | Feb. 25, 1919 |
| 1,475,081 | Parks | Nov. 20, 1923 |
| 2,203,672 | Chester | June 11, 1940 |
| 2,376,722 | Podell | May 22, 1945 |
| 2,534,683 | Schmidt et al. | Dec. 19, 1950 |
| 2,566,651 | Bemis | Sept. 4, 1951 |